United States Patent [19]
Hynson

[11] 3,958,772
[45] May 25, 1976

[54] BALE HANDLING APPARATUS

[76] Inventor: David R. Hynson, Rte. 1, Box 2528, Montpelier, Va. 23192

[22] Filed: July 7, 1975

[21] Appl. No.: 593,421

[52] U.S. Cl. .................... 242/86.5 R; 214/147 G
[51] Int. Cl.² ........................................ B65H 75/40
[58] Field of Search .......... 242/86.5 R; 214/147 R, 214/147 G; 294/DIG. 2

[56] References Cited
UNITED STATES PATENTS

| | | | |
|---|---|---|---|
| 3,874,609 | 4/1975 | Larson | 242/86.5 R |
| 3,877,595 | 4/1975 | Edelman | 214/147 G |
| 3,880,305 | 4/1975 | Van Polen | 242/147 G |
| 3,908,846 | 9/1975 | Brummitt | 242/86.5 R |

*Primary Examiner*—Edward J. McCarthy
*Attorney, Agent, or Firm*—Mason, Fenwick & Lawrence

[57] ABSTRACT

A haybale handling apparatus is disclosed which includes a support structure mountable on a three point hitch of a tractor, auxiliary wheels mounted on the support structure and positionable to contact the ground thereby permitting the lifting, weighing and loading to legal roadway heights safely of heavy hay bales without tipping the tractor on which the apparatus is mounted, an actuation link movably pivoted at its lower end to the support structure, an intermediate link movably pivoted at the upper end of the actuation link and having a movably lifting link pivoted at its opposite end, a bale claw rotatable by a hydraulic motor about a generally vertical axis and mounted at the free end of the lifting link, said bale claw including a support member and downwardly extending pivoted clamp links which are slidably mounted at opposite ends of the support member with projections at the lower end of the clamp links which may be forced into a bale of hay by hydraulic cylinders operatively connected between the support member and the clamp links and a hydraulic motor for rotating the projections about a generally horizontal axis, and a weighing device mounted on the lift link to determine the weight of each bale.

17 Claims, 6 Drawing Figures

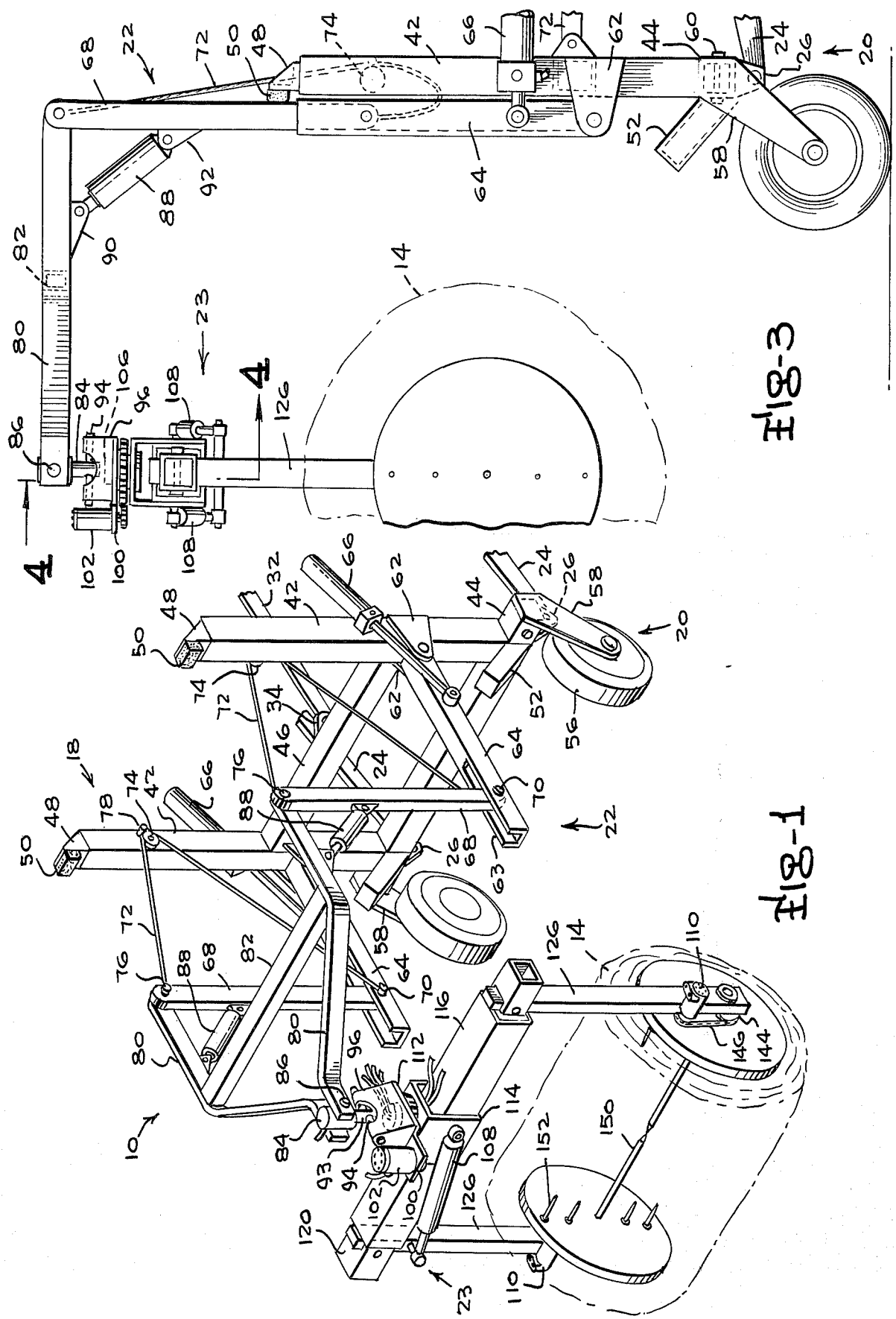

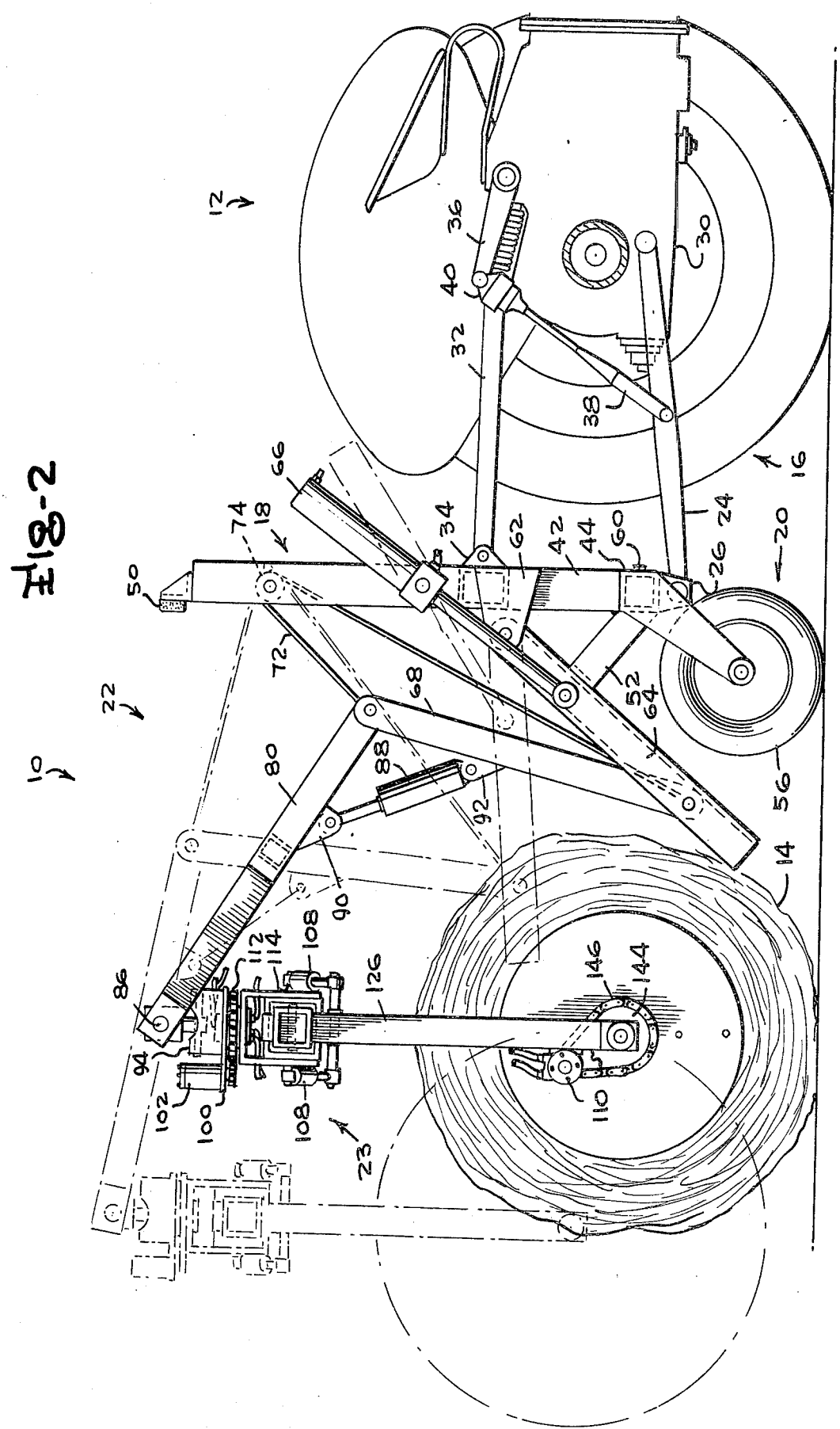

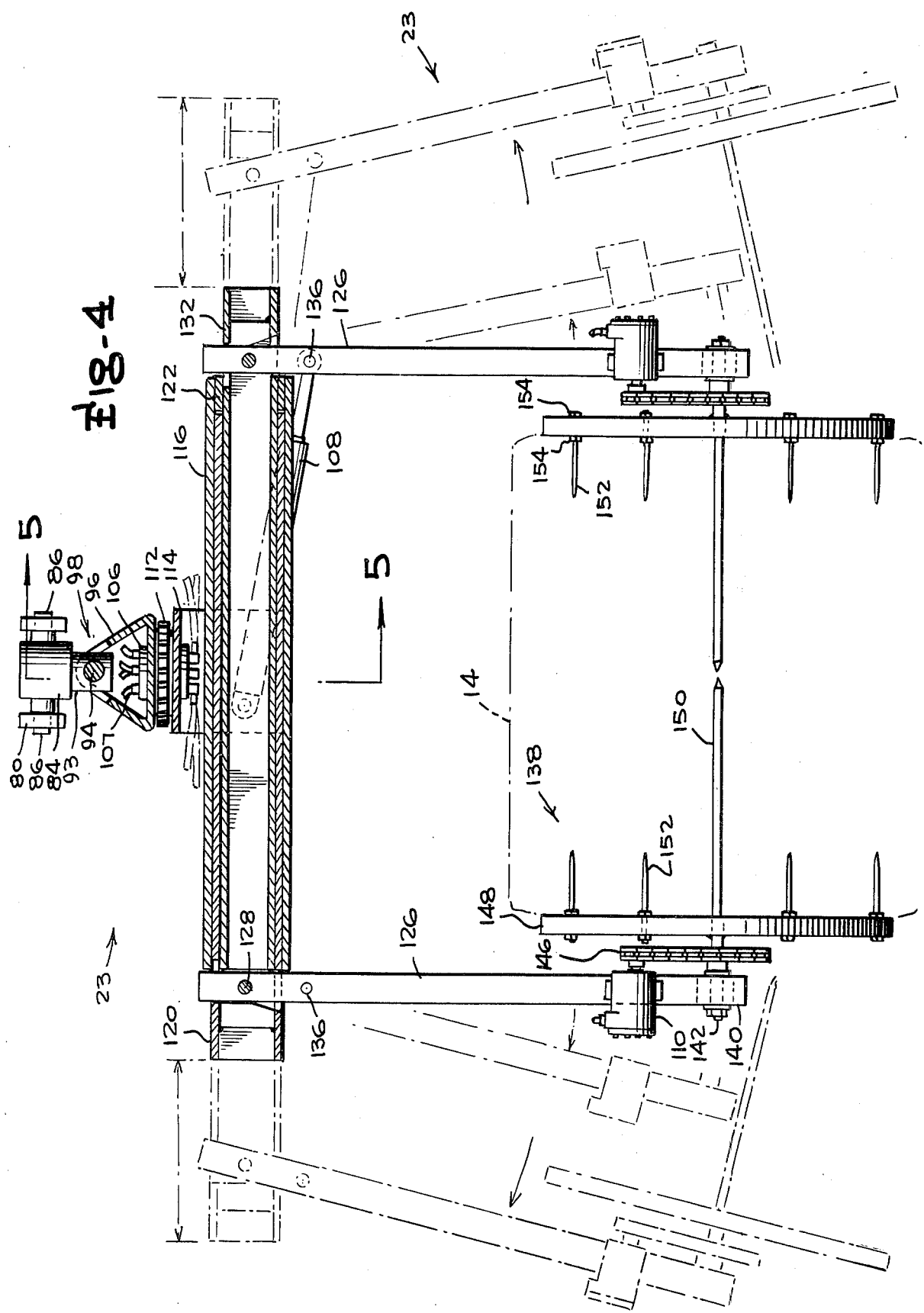

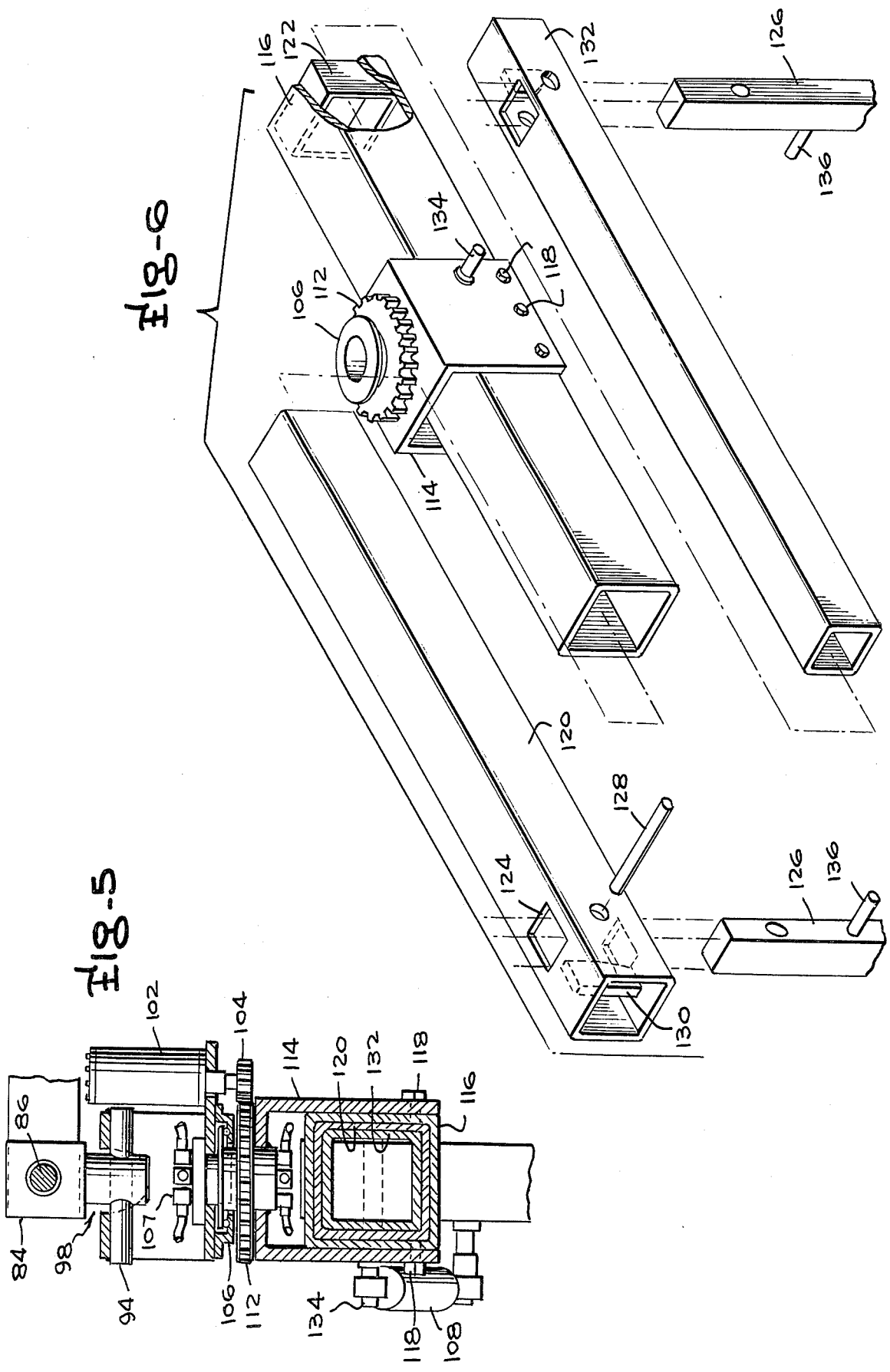

BALE HANDLING APPARATUS

HAY BALE HANDLING APPARATUS

This invention is in the field of hay bale handling equipment and the like and is specifically directed to a hay bale handling apparatus which is capable of manipulating bales of hay without extensive maneuvering of the vehicle on which it is mounted or requiring any hand labor thereby permitting a single operator to transport and position large bales of hay.

A relatively recent development in the agricultural field has been the introduction of hay balers which are capable of producing heavy cylindrical bales of hay which may vary in weight from 500 to 4,000 lbs with widths of 4 to 6 ft. and diameters of 5 to 7 ft. These hay balers have been very successful because they significantly reduce the amount of labor required to harvest hay for livestock feeding and dairying operations. With these hay balers, a single person is able to cut and harvest large quantities of hay very quickly thereby taking advantage of the limited periods of weather which are suitable for drying and harvesting hay as occur in many parts of the country. These bales of hay are weather resistent and therefore may be stored outdoors which eliminates the high capitol investment which has previously been necessary to protect hay from the weather. Numerous hay balers of different design have been marketed to produce these large cylindrical hay bales.

The equipment necessary to handle these hay bales after they have been harvested have had limited flexibility in handling bales of various different sizes. More importantly this handling equipment has had limited capability for manipulate a bale of hay into a hay bunk such as are used in feed lot operations and for positioning these large bales of hay for transport on a flat bed truck without requiring any additional hand labor. Prior hay bale handlers have been primarily designed to lift the bales of hay a short distance off the ground and retain them in a transport position such as in cradle for transporting the bales of hay from one location to another and placing them back on the ground.

There has been an increasing demand for a hay bale handler for manipulating and positioning these large bales of hay. The prior art hay bale handlers have limited ability to accomodate various sizes of bales and frequently are unable to secure an adequate grip on the bale to prevent dropping the bale from the handler. Additionally prior art handling apparatuses have not been capable of manipulating a bale after it has been elevated to a height sufficient to place the bale on a flatbed truck or on other bales without maneuvering the tractor on which the hay bale handling apparatus is mounted. None of the prior hay bale handlers have been capable of unrolling the bales of hay into anything but a flat layer on the ground or on the snow which results in a significant loss of hay due to trampling by the live stock feeding upon the unrolled hay.

With these prior art devices, additional hand labor has been necessary to accomplish many of the steps of transporting, storing and feeding. Another limitation of the prior art devices has been the inability to elevate these large and heavy bales to positions which are high above the ground thereby permitting flexibility of storing, stacking and feeding with a conventional farm tractor.

Currently available hay balers are capable of producing in excess of 20 tons of baled hay per hour in bales which weigh approximately 3,000 lbs. The increasing costs and frequent unavailability of field hands to support the transporting, storing and feeding operations has created a strong demand for an efficient and flexible hay bale handling apparatus to reduce the time necessary to lift, load, unload, stack and store hay bales.

It is consequently the primary purpose of this invention to provide a new and improved apparatus for handling large bales of hay.

It is an additional object of the present invention to provide a hay bale handling apparatus which can lift, load, unload, stack, weigh, unroll and store large bales of hay quickly and efficiently.

Another object of the present invention is to provide a hay bale handling apparatus which is capable of lifting the bales to high elevations without tipping the tractor on which the apparatus is mounted.

A still further object of the present invention is to provide a hay bale handling apparatus which permits the positioning of large bales of hay on a flatbed truck or on other bales of hay without requiring any maneuvering of the tractor on which the apparatus is mounted or without requiring any additional hand labor to assist the operator.

A still further object of the present invention is to provide a hay bale handler which is capable of quickly and efficiently placing large bales of hay in feed bunks or unroll hay in currently used types of bunks.

A still further object of the present invention to reduce the amount of hay wasted in pasture or lot feeding operations.

An additional object of the present invention is to provide a hay bale handler which is tractor mounted and permits over-the-road hauling.

A further object of the present invention to provide a hay bale handling apparatus which permits the lifting, loading, unloading, stacking, weighing, unrolling and storing of hay bales by single operator efficiently and expeditiously to reduce the cost of harvesting and feeding hay to livestock.

The obtainment of the objects of this invention is enabled through the provision of a support structure having a three point hitch for mounting on the rear end of a tractor. Auxiliary wheels are mounted on the support structure to contact the ground thereby permitting the lifting of heavy hay bales without tipping the tractor. A pair of transversely spaced apart actuation links are pivoted at their lower ends to the support structure and have hydraulic cylinders pivoted at one end to a central part of the actuation links and pivoted at the opposite end of the cylinders to the support structure. Intermediate links are pivoted to the upper ends of the actuation links and have lifting links at their opposite ends actuated by hydraulic cylinders with ends connected centrally of the intermediate links and the lifting links respectively.

A bale claw is mounted between the free ends of the lifting links and is operatively connected to a hydraulic drive motor which rotates the bale claw as desired about a vertical axis. The bale claw includes a support member with a pair of downwardly extending clamp links which are slidably and pivotally mounted at opposite ends of the support member. The lower ends of the clamp links have projections which may be forced into the center of the bales of hay by sliding and pivoting the clamp links toward one another to prevent the bales from slipping out of the bale claw while the bales are being lifted. Clamping hydraulic cylinders are operatively connected between the two links and the support member to cause the clamp links to translate and rotate toward one another thereby forcing the projections into the center of the bale. The projections are rotatable about a generally horizontal axis by a hydraulic motor to permit unrolling of the hay bales. A weighing means mounted on the lift link permits the determination of the weight of hay in each bale.

A better understanding of the subject invention will be enabled when the following written description is read in conjunction with the appended drawings in which:

FIG. 1 is a perspective view illustrating the preferred embodiment of the present invention in its half raised position;

FIG. 2 is an enlarged side view of the present invention in its lowest position showing the preferred embodiment attached to the three point hitch of a tractor which is partially shown;

FIG. 3 is a fragmentary side view of the preferred embodiment shown in FIG. 2 with the bale of hay fully raised;

FIG. 4 is a fragmentary sectional view of the preferred embodiment taken on lines 4—4 in FIG. 3;

FIG. 5 is an enlarged fragmentary sectional view taken along lines 5—5 of FIG. 4; and FIG. 6 is an exploded enlarged perspective view of the support member for the bale claw.

Attention is initially invited to FIG. 1 of the drawings which illustrates the preferred embodiment of the invention 10 in use in conjunction with a tractor partially shown at 12 to lift and manipulate a bale of hay 14. The preferred embodiment 10 includes a three point tractor hitch 16, a support structure 18, auxiliary wheel assemblies 20, elevating linkage assembly 22 and a bale claw assembly 23.

The three point tractor hitch 16 includes a pair of transversely disposed hitch lift links 24 pivotally attached to lift link brackets 26 mounted on the support structure 18 at the forward end of the hitch lift links 24, and pivotally attached to the main frame 30 of the tractor 10 at their opposite ends as shown in FIG. 2. A top support link 32 is pivotally supported at its forward end on a support link bracket 34 mounted on the support structure 18 and is pivotally attached to the main frame 30 of the tractor at its opposite end. A pair of transversely disposed power crank arms 36 raise and lower the lift links 24 through power crank links 38 pivotally connected to the lift links at a position central of the ends of the lift links, as shown in FIG. 2. The opposite ends of the power crank links 3 are connected to the power crank arms 36 by intermediate shock absorber elements 40.

The support structure 18 includes a pair of transversely disposed vertical side members 42 connected by a horizontal bottom member 44 fixed as by welding to the lower ends of the vertical side members 42 and having the lift link brackets 26 mounted near the ends thereof. A horizontal upper member 46, as shown in FIG. 1, is attached to the vertical side members 42 central of the ends of the side members and has attached thereto the support link bracket 34 which provides a pivotal connection between the support link 32 and the support structure 18.

Attached to the upper end of the vertical side members 42 are angle brackets 48 having resilient pads 50 which extend outwardly beyond the rear side of the vertical side members 42. Attached to the horizontal bottom member 44 adjacent the lower end of the vertical side members 42, as shown in FIGS. 1, 2 and 3, are short stop members which extend diagonally upward and toward the rear.

The auxiliarly support wheel assemblies 20 are attached to the ends of the horizontal bottom member 44 and include a ground engaging wheel 56 pivotally supported at the end of a wheel support member 58 which extends downwardly and rearwardly from the horizontal bottom member 44 and is attached to a telescoping member which is not shown. The telescoping member slides inside the horizontal bottom member 44. The telescoping member can be locked in any desired position by lock bolts 60 to permit telescoping the wheel assemblies outwardly from the ends of the horizontal bottom member 44 if additional stability of the harvester is required. The telescoping may be necessary when vary large bales are being raised or when the bales are being raised to high elevations if the ground is sloping as frequently occurs in fields where hay is being harvested.

Extending rearwardly from the inner and outer sides of the vertical frame members 42 are pairs of actuation link brackets 62 which form pivotal supports for a pair of transversely disposed actuation links 64, as best shown in FIG. 1. Members 42, 44, 46 and 52 also links 64 are preferably formed of tubular steel of rectangular cross section which is easily welded together to form the support structure 18 and to mount the various brackets thereto. One end of the actuation links 64 is pivotally connected to the actuation link brackets 62. A central portion of the actuation links is connected to the piston of an actuation hydraulic cylinder 66 which has its cylinder housing pivotally mounted on the outer side of the vertical side member 42 above the actuation link bracket 62. The actuation hydraulic cylinder 66 provides the primary lifting force for elevating the bale of hay 14. A slot 63 is formed at the free end of each actuation link 64 by removing a portion of the upper side wall to permit an intermediate link 68 of rectangular cross section to be pivoted therein centrally of the slot opening. Therefore the bottom side wall at the upper end of the actuation link provides a forward stop for the intermediate link 68 when it has pivoted downwardly and comes into contact with the bottom side wall of the actuation link 64. This forward stop permits the intermediate link 68 to be raised to a vertical position by the actuation hydraulic cylinder 66 when the cylinder is retracted as shown in FIG. 3.

The intermediate link 68 is preferably of a rectangular cross section which fits closely within the central opening of the actuation link 64. The pivot between the actuation link 64 and the intermediate link 68 is provided by pivot pin 70 which extends out of the inner side wall of the actuation link as shown in FIG. 1. Attached to the extended portion of the pivot pins 70 are guide cables 72 which pass around rollers 74 pivotally mounted on the upper ends of the vertical side members 42. The opposite ends of the cables 72 are connected to lifting link pivot pins 76 which are mounted at the upper end of the intermediate links 68 and which extending inwardly. A guide pin 78 prevents the cable 72 from leaving the guide roller 74.

Pivotally attached to the lifting link pivot pins 76 are claw lifting links 80 which are connected by a transverse lifting link reinforcing member 82 attached to the claw lifting links 80 intermediate the ends of the claw lifting links 80. The free ends of the claw lifting links 80 are parallel and close together to provide support for a weighing hydraulic cylinder 84 which has case pivot pins 86 extending outwardly from the case of the hydraulic cylinder and extending through holes in the free ends of the lifting links 80 as shown in FIG. 1.

The weighing hydraulic cylinder 84 is connected in a closed loop to a pressure gauge, not shown which can be calibrated to read the weight of the bale 14 being lifted. This direct reading eliminates the need for auxiliary scales to determine the weight of the bales.

The claw lifting links 80 are rotated about the ends of the intermediate links 68 by lifting link hydraulic cylinders 88 having the free end of the piston pivotally connected to piston brackets 90 mounted centrally on the claw lifting link and having the cylinder housing pivotally mounted on cylinder pivot brackets 92 mounted centrally on the intermediate link 68.

The piston 93 of the weighing hydraulic cylinder 84 has pins 94 which extend transversely to the case pivot pins 86 and support a pivot housing 96 which is a triangular shaped tube having a central opening 98 through a vertex edge of the pivot housing. The central opening 98 is sized to fit around the weighing hydraulic piston 93 with the pivot pins 94 extending along the inner edge of the pivot housing 96 thereby permitting gimbaling of the bale claw assembly 23 about pivot pin 94 and about case pivot pins 86. The lower wall of the pivot housng 96 extends outwardly at one end to provide a hydraulic motor support bracket 100 to which is mounted a hydraulic drive motor 102 having a drive gear 104 mounted on its downwardly extending drive shaft. Mounted directly below the weighing hydraulic cylinder and having its center in alignment with the intersection between the pivot pin 94 and the cylindrical protrusions 96 is a conventional rotary bearing 106 as best shown in FIG. 5.

Passing through the center of the bearing 106 is a multiple hydraulic passageway which permits a 360° pivoting of the bale claw assembly. Such a multiple hydraulic passageway is provided by the Multi-Swivel unit which is manufactured by the Chiksan Div. of FMC. These hydraulic passageways provide actuation fluid for clamping hydraulic cylinders 108 and bale rotating hydraulic motors 110. The upper race of the claw rotary bearing 106 is fixed to ring gear 112 with the drive gear 104 engaging the ring gear 112. When the hydraulic motor 102 is actuated, the bale claw can be pivoted through 360° to permit manipulation and positioning of the hay bale 14 as desired. A bale claw support member 114 which is U-shaped and downwardly opening is fixed to the ring gear 112.

Attached to the two legs of the U-shaped bale claw support member 114 is a horizontal outer support member 116 which is fastened by rivets 118, as shown in FIGS. 5 and 6, and is formed of a square elongated tube. An intermediate telescoping tube 120 fits closely within the horizontal outer support member 116 and is slidable therein to provide for telescoping of the bale claw assembly. A telescoping tube stop 122 which is formed from a short section of square tubing, similar to the intermediate telescoping tube 120, is welded at one end of the horizontal outer support member 116 to prevent the intermediate telescoping tube member from being forced too far into the horizontal outer support member by the clamping hydraulic cylinder 108.

The free end of the intermediate telescoping tube 120 extending beyond the horizontal outer support member 116, has an upper and lower rectangular cut out 124 to receive a clamping link 126. The clamping link extends downwardly through the rectangular openings 124 and is pivoted on a clamping link pivot pin 128 which passes through holes in the side walls of the intermediate telescoping tube 120 and through a hole in the upper end of the clamping link 126. The clamping link is free to pivot within the rectangular cutouts 124 and is stopped by the ends of the cutouts to limit the movement of the clamping link to desired angles of rotation. A reinforcing block 130, shown in FIG. 6, prevents collapse of the end of the intermediate telescoping tube adjacent the rectangular cutouts 124.

An inner telescoping tube 132 has rectangular cutouts, a pivot pin, a reinforcing block, and a clamping link 126 which are similar to the intermediate telescoping tube 120. The inner telescoping tube 132 fits closely within the intermediate telescoping tube and has a stop similar to telescoping tube stop 122 within intermediate telescoping tube 120 although it is not shown.

The clamping hydraulic cylinders 108 are pivoted at one end to pins 134 mounted on the bale claw support member 114 and are pivoted at the other end to cylinder pivot pins 136 mounted on the clamping links 126 below clamping link pivot pins 128. When the clamping hydraulic cylinders 108 are activated, the telescoping tubes translate outwardly and the clamping links 126 pivot outwardly as shown in the various positions depicted in FIG. 4.

Bale claws 138 are mounted on the lower ends of the clamping links 126 and include a rotary bearing 140, schematically shown in FIG. 4, which supports a bale claw shaft 142. A bale drive gear 144 is fixed to the bale claw shaft and is driven by drive chain 146 which passes over the drive gear of the bale rotating hydraulic motor 110 also mounted on the lower end of the clamping link 126. Attached to the inner end of the bale claw shaft is a clamping disc 148 having an elongated sharp projection 150 extending from the center thereof to enter the center of the bale. Diametrically spaced apart short tines 152 are directed inwardly from the clamping discs 148 to prevent the hay bale 14 from rotating around the elongated sharp probe 150 when the bale of hay is being unrolled. The short tines 152 have a threaded portion which passes through the clamping disc 148 and nuts 154 thereon to mount the tines as shown in FIG. 4.

Operation of the present invention is quickly and easily accomplished by backing the tractor 12 up to the hay bale 14, as shown in FIG. 2, with the bale claw assembly 22 fully opened, as shown in the outer position of FIG. 4. Opening of the bale claw assembly is accomplished by actuating the clamping hydraulic cylinders 108. Support wheels 56 are positioned against the ground by rotating the power crank arm 36 downwardly thereby causing the transversely disposed lift links 24 to lower the support structure 18. When the bale claw assembly is positioned as shown in FIG. 2, the clamping hydraulic cylinders 108 are retracted which forces the elongated sharp probe 150 into the center of the bale and forces the short tines 152 into the ends of the bales as indicated in FIGS. 1 and 4. In this position, the actuation links 64 are resting against the stop members 52 and the lifting link hydraulic cylinders 88 are extended as much as necessary to raise the lift links 80 and position the probes 150 in the center of the hay bale 14.

The hay bale is raised by retracting the actuation hydraulic cylinders 66 which causes the actuation links 64 to pivot in actuation link brackets 62. The intermediate links 68 are thereby raised and the guide cables 72 slides around the guide rollers 74 to permit the intermediate links to assume the position shown in dotted lines in FIG. 2 which raises the bale of hay off the ground. Further retraction of the actuation hydraulic cylinder 66 causes the links to assume the uppermost position as shown in FIG. 3. In this uppermost position, the intermediate links 68 rest against the resilient pads 50 on the upper side and against the bottom side of the actuation link 64 on the lower side. Further raising of the bale of hay 14 may be accomplished by extending the lifting link hydraulic cylinders 88 which causes the lifting links 80 to rotate upwardly from the position shown in FIG. 3.

The bale of hay may then be placed on a flat bed truck by backing up to the truck or into a feed bunk as desired. It is a simple procedure to rotate the bale of hay by activating hydraulic motor 102 to position the bale of hay in the desired orientation before it is lowered onto a release surface such as a flatbed truck. This maneuverability eliminates the necessity of manually moving the bale of hay to place it into a desired position or the necessity of maneuvering the tractor to place the bale of hay in the desired position. The process is simply reversed to lower and release the bale of hay.

If it is desired to feed livestock in the field, the tractor may be driven down the field with the bale rotating hydraulic motors 110 activated thereby causing the bale of hay to be unrolled and simultaneously activating hydraulic motor 102. The bale of hay will be rotated around the vertical axis thereby causing the unrolled hay to twist into a spiraling surface which tends to stand upright in the field or unrolled against a fence as the tractor is traveling. The amount of hay wasted is reduced because the spiraling surface is not trampled by the feeding livestock.

If additional stability is required during the lifting of a bale, the support wheels 56 may be telescoped outwardly by repositioning the lock bolts 60 to spread the support wheels 56 outwardly thereby increasing the stability of the apparatus for lifting heavier bales or for lifting while the tractor is positioned on a sloping surface. The elevated bales may be transported about the farm or over-the-road by leaving the support wheels 56 in contact with the ground.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the appended claims.

I claim:

1. A bale handling apparatus for lifting, loading, unloading, stacking and unrolling large cylindrical bales of hay, said bale handling apparatus comprising a portable support structure, a holding means for retaining the bale, an elevating means mounted on the support structure for lifting the holding means, a first rotation means on the holding means for rotating the bale about the center of the bale to unroll the hay in the bale and a second rotating means mounted on the elevating means for rotating the bale about an axis other than the center of the bale thereby producing a spiraling layer of hay as the hay in the bale is unrolled.

2. The bale handling apparatus of claim 1 wherein the holding means for retaining the bale includes a support member, clamp links having an upper and a lower end, means movably supporting the upper ends of the clamp links on the support member for translating motion of said upper ends toward and away from each other and for pivoted movement of the lower ends of the clamp links toward and away from each other.

3. The bale handling apparatus of claim 2 additionally including projections pivotally mounted at the lower ends of the clamp links and directed inwardly whereby positioning the projections at the ends of a bale of hay and actuating the movably supporting means will cause the clamp links to translate and rotate toward each other thereby causing the projections to be forced into the ends of the bale of hay and wherein the first rotation means rotates the projections thereby causing the bale of hay to rotate about its center and unroll the hay in the bale.

4. The bale handling apparatus of claim 3 wherein the movably supporting means includes a first telescoping member which is slidably mounted in the support member and has one of the clamp links pivotally mounted therein, a second telescoping member which is slidably mounted in the support member and has the second clamp link pivotally mounted therein and hydraulic clamping cylinders pivotally mounted between the support member and each of the clamp links, and wherein the first rotation means includes a hydraulic motor mounted on the clamp link and operatively connected to the projections to cause rotation of the projections.

5. The bale handling apparatus of claim 4 wherein the second rotating means includes a rotary bearing mounted between the elevating means and the support means and a hydraulic motor mounted on the elevating means and operatively connected to the support means thereby permitting the hydraulic motor to rotate the support means, clamp links and hay bale.

6. The bale handling apparatus of claim 1 wherein the elevating means includes an actuation link having a first end and a second end, means pivotally supporting the first end of the actuation link on the support structure for rotating the actuation link, an intermediate link having an upper and a lower end, means pivotally supporting said lower end on the second end of the actuation link, a lifting link, means pivotally supporting one end of the lifting link on the upper end of the intermediate link for rotating the lifting link relative to the intermediate link and wherein the holding means is mounted at the free end of the lifting link.

7. The bale handling apparatus of claim 6 additionally including a guide on the support structure and a flexible cable operatively connected to the actuation link, passing through the guide on the support structure and operatively connected at its second end to the intermediate link.

8. A bale handling apparatus for attachment to a farm tractor having a three-point hitch, said bale handling apparatus comprising a portable support frame extending transversely of the tractor, an attaching means for connecting the support structure to said three-point hitch thereby permitting up and down movement of the support structure through actuation of the three-point hitch, an actuation link having a first end and a second end, means pivotally supporting the first end of the actuation link on the support structure for rotating the actuation link, an intermediate link having an upper and a lower end, means pivotally supporting said lower end on the second end of the actuation link, a lifting link, means pivotally supporting one end of the lifting link on the upper end of the intermediate link for rotating the lifting link relative to the intermediate link, and a holding means mounted at the free end of the lifting link for retaining the bale.

9. The bale handling apparatus of claim 8 wherein the means pivotally supporting said lower end on the second end of the actuation link includes a pivot between the intermediate link and the actuation link, a flexible cable operatively connected at one end to the actuation link and at the opposite end to the intermediate link, and a guide on the support structure through which the flexible cable passes.

10. The bale handling apparatus of claim 9 additionally including a rotating means mounted on the lifting link for rotating the bale about a generally vertical axis.

11. A bale handling apparatus for attachment to a farm tractor having a three-point hitch, said bale handling apparatus comprising a portable support frame extending transversely of the tractor, an attaching means for connecting the support structure to said three-point hitch thereby permitting up and down movement of the support structure through actuation of the three-point hitch, transversely disposed support wheels on the support structure, a pair of transversely spaced apart actuation links, actuation means for rotating said actuation links about a transverse axis of said tractor, a pair of intermediate links pivotally connected at one end to the actuation links, a pair of lifting links pivotally connected at one end to the intermediate links, lifting actuation means for rotating the lifting links relative to the intermediate links, a pair of flexible cables operatively connected at one end to the actuation links and at the opposite end to the intermediate links, a pair of guides on the support structure through which the flexible cables pass, a gimbol mounted on the lifting link, a support member mounted to the gimbol, a pair of telescoping members slidably mounted on the support member, a pair of clamping links pivotally connected at one end to the telescoping members, projection means mounted on the clamping links for gripping a bale of hay, means for sliding the telescoping members toward and away from each other and for pivoting the clamping links toward and away from one another to force the projection means into the ends of the bale.

12. The bale handling apparatus of claim 11 additionally including a means for rotating the support member about a generally vertical axis.

13. The bale handling apparatus of claim 12 additionally including means for rotating the projection means about a generally horizontal axis.

14. The bale handling apparatus of claim 12 wherein the projection means comprise a rotary bearing mounted in at least one of the clamp links, a bale claw shaft extending through the rotary bearing, a shield disc mounted on the shaft, an elongated prong mounted in the center of the disc, a radially displaced tine attached to the disc for preventing rotation of the bale about the elongated prong, and a hydraulic motor mounted on the clamp link and operatively connected to the bale claw shaft to cause rotation of the shaft and disc.

15. The bale handling apparatus of claim 11 additionally including telescoping means for extending the support wheels transversely of the support structure thereby increasing the stability of the handling apparatus.

16. The bale handling apparatus of claim 7 additionally including a means for weighing the bale of hay.

17. The bale handling apparatus of claim 11 additionally including a means for weighing the bale of hay.

* * * * *